United States Patent
Niizuma (10) Patent No.: US 9,742,202 B2
(45) Date of Patent: Aug. 22, 2017

(54) SHIP POWER-RECEIVING STRUCTURE, SHIP POWER-SUPPLYING DEVICE AND SHIP POWER-SUPPLYING METHOD

(71) Applicant: IHI Corporation, Tokyo (JP)

(72) Inventor: Motonao Niizuma, Tokyo (JP)

(73) Assignee: IHI CORPORATION (JP)

( * ) Notice: Subject to any disclaimer, the term of this patent is extended or adjusted under 35 U.S.C. 154(b) by 305 days.

(21) Appl. No.: 14/483,370

(22) Filed: Sep. 11, 2014

(65) Prior Publication Data

US 2014/0375140 A1    Dec. 25, 2014

Related U.S. Application Data

(63) Continuation of application No. PCT/JP2013/060820, filed on Apr. 10, 2013.

(30) Foreign Application Priority Data

Apr. 13, 2012  (JP) ................................ 2012-092176

(51) Int. Cl.
*H02J 5/00*        (2016.01)
*B63J 99/00*       (2009.01)
(Continued)

(52) U.S. Cl.
CPC .............. *H02J 5/005* (2013.01); *B63J 99/00* (2013.01); *B63H 21/00* (2013.01); *B63J 3/04* (2013.01)

(58) Field of Classification Search
CPC ......... H02J 5/0005; H01F 38/00; H01F 38/14
(Continued)

(56) References Cited

U.S. PATENT DOCUMENTS

2009/0189458 A1*  7/2009  Kawasaki ............ B60L 11/182
                                                              307/104
2010/0156346 A1*  6/2010  Takada .................. B60L 11/182
                                                              320/108
(Continued)

FOREIGN PATENT DOCUMENTS

CN        102239633 A     11/2011
CN        202152117 U      2/2012
(Continued)

OTHER PUBLICATIONS

Europan Search Report, dated Dec. 15, 2015, issued in corresponding European Patent Application No. 13775110.3. Total 6 pages.
(Continued)

*Primary Examiner* — Jared Fureman
*Assistant Examiner* — Win Htun
(74) *Attorney, Agent, or Firm* — Ostrolenk Faber LLP (57) ABSTRACT

A power-receiving structure is provided in a ship and includes a power-receiving coil capable of wirelessly receiving electric power from a power-supplying coil on a land-side and an outer wall surface-forming section forming an outer surface of side of the ship, and the power-receiving coil is provided on an inside of the ship from the outer wall surface-forming section, and an electromagnetic field-transmissive section formed of a material through which an electromagnetic field propagates is provided in an opposing portion to the power-receiving coil in the outer wall surface-forming section. According to the present invention, the power-receiving coil is not protruded from the outer surface of side of the ship and can wirelessly receive electric power from the power-supplying coil on the land-side through the electromagnetic field-transmissive section. Accordingly, the power-receiving coil does not disturb the navigation of the
(Continued)

ship and is not required to be pulled into the ship after the supply of the electric power to the ship is finished.

9 Claims, 6 Drawing Sheets

(51) Int. Cl.
*B63J 3/04* (2006.01)
*B63H 21/00* (2006.01)

(58) Field of Classification Search
USPC .......................................................... 307/104
See application file for complete search history.

(56) References Cited

U.S. PATENT DOCUMENTS

| | | | |
|---|---|---|---|
| 2010/0201204 A1* | 8/2010 | Sakoda | H02J 5/005 307/104 |
| 2010/0231340 A1 | 9/2010 | Fiorello | 336/92 |
| 2011/0199028 A1* | 8/2011 | Yamazaki | H02J 7/0054 318/139 |
| 2011/0241440 A1* | 10/2011 | Sakoda | H02J 5/005 307/104 |
| 2011/0309689 A1* | 12/2011 | Kamata | H02J 5/005 307/104 |
| 2012/0043172 A1* | 2/2012 | Ichikawa | B60L 5/005 191/45 R |
| 2012/0203410 A1* | 8/2012 | Wechlin | B60L 11/182 701/22 |
| 2013/0005408 A1* | 1/2013 | Matsui | H01Q 1/243 455/573 |
| 2013/0154382 A1* | 6/2013 | Kurata | H02J 17/00 307/104 |
| 2014/0097671 A1* | 4/2014 | Nakamura | B60L 3/04 307/9.1 |
| 2014/0111021 A1* | 4/2014 | Nakamura | B60M 7/003 307/104 |
| 2015/0326028 A1* | 11/2015 | Suzuki | H02J 5/005 307/104 |

FOREIGN PATENT DOCUMENTS

| | | |
|---|---|---|
| EP | 2 421 116 A2 | 2/2012 |
| JP | 10-028332 | 1/1998 |
| JP | 2004-194444 | 7/2004 |
| JP | 2004194444 A * | 7/2004 |
| JP | 2006-345588 | 12/2006 |
| JP | 2006345588 A * | 12/2006 |
| JP | 2009-177921 | 8/2009 |
| JP | 2010-011696 | 1/2010 |
| JP | 2010011696 A * | 1/2010 |
| JP | 2011-229244 | 11/2011 |
| WO | WO 2010/036980 A1 | 4/2010 |
| WO | WO 2011/006884 A2 | 1/2011 |
| WO | WO 2011/021162 A2 | 2/2011 |

OTHER PUBLICATIONS

International Search Report and Written Opinion mailed Jun. 11, 2013 in corresponding PCT International Application No. PCT/JP2013/060820.

* cited by examiner

SHIP POWER-RECEIVING STRUCTURE, SHIP POWER-SUPPLYING DEVICE AND SHIP POWER-SUPPLYING METHOD

The present invention relates to a ship power-receiving structure, a ship power-supplying device and a ship power-supplying method. This application is a continuation application based on a PCT Patent Application No. PCT/JP2013/060820 filed on Apr. 10, 2013, whose priority is claimed on Japanese Patent Application No. 2012-92176 filed on Apr. 13, 2012. The contents of both the PCT application and the Japanese Patent Application are incorporated herein by reference.

TECHNICAL FIELD

Background Art

There are cases where electric power required for a ship is wirelessly supplied to the ship. An example of the power-supplying method is described in the following Patent Document 1.

In the Patent Document 1, electric power is supplied in the following manner. In order to wirelessly supply electric power to a moored ship, a power-supplying coil is provided on a land-side and a power-receiving coil is provided on a ship-side. An alternating current having a high frequency (for example, 10 kHz to 30 kHz) is fed to the power-supplying coil, thereby generating electric power in the power-receiving coil. The electric power generated in the power-receiving coil is supplied to a power system provided in the ship.

DOCUMENT OF RELATED ART

Patent Document

[Patent Document 1] Japanese Unexamined Patent Application Publication (JP-A) No. 2010-11696

SUMMARY OF INVENTION

Technical Problem

In the Patent Document 1, the power-receiving coil is provided to be protruded from an outer wall of the ship. For this reason, there is a possibility that the power-receiving coil might disturb navigation.

On the other hand, it is also supposed that the power-receiving coil is pulled into the ship after receipt of electric power through the power-receiving coil is finished. In this case, a great deal of time and labor is required to pull the power-receiving coil in.

The present invention is conceived in view of the above-described circumstances and it is an object thereof to provide a ship power-receiving structure, a ship power-supplying device and a ship power-supplying method in which a power-receiving coil provided on a ship-side supplies electric power from outside of the ship to the ship through the power-receiving coil, the power-receiving coil does not disturb navigation and a great deal of time and labor required to pull the power-receiving coil in the ship can be eliminated after the supply of electric power to the ship is finished.

Solution to Problem

In order to achieve the above-described object, a power-receiving structure according to a first aspect of the present invention is a power-receiving structure that is provided in a ship and includes a power-receiving coil capable of wirelessly receiving electric power from a power-supplying coil on a land-side, and an outer wall surface-forming section forming an outer surface of side of the ship, and the power-receiving coil is provided on an inside of the ship from the outer wall surface-forming section, and an electromagnetic field-transmissive section formed of a material through which an electromagnetic field propagates is provided in an opposing portion to the power-receiving coil in the outer wall surface-forming section.

Moreover, in the power-receiving structure according to a second aspect of the present invention, in the above-described first aspect, the material of the electromagnetic field-transmissive section is plastic. Furthermore, in the power-receiving structure according to a third aspect of the present invention, in the above-described second aspect, the plastic is fiber reinforced plastic.

A power-supplying device according to a first aspect of the present invention is a device configured to supply electric power to a ship having the power-receiving structure and includes a power-supplying coil, provided on a land-side, configured to supply electric power to the power-receiving coil through the electromagnetic field-transmissive section, a supply power measuring section configured to measure electric power supplied to the power-supplying coil, a receiving section configured to receive, from a ship-side, a measured value of electric power received from the power-supplying coil by the power-receiving coil, an efficiency calculating section configured to calculate the efficiency of electric power transmission from the power-supplying coil to the power-receiving coil based on the supplied electric power measured by the supply power measuring section and the measured value of the electric power received by the receiving section, a moving device, provided on the land-side, configured to move the power-supplying coil, and a control device configured to control the moving device to move the power-supplying coil based on the efficiency calculated by the efficiency calculating section, thereby adjusting a position of the power-supplying coil with respect to the power-receiving coil.

Furthermore, a power-supplying method according to a first aspect of the present invention is a power supplying method using the power-supplying device and includes a first step of disposing the power-supplying coil with respect to the power-receiving coil when the ship is moored, a second step of temporarily supplying electric power from the power-supplying coil to the power-receiving coil through the electromagnetic field-transmissive section, and a third step of calculating the efficiency of the electric power transmission from the power-supplying coil to the power-receiving coil in the second step by the efficiency calculating section, and the first to third steps are repeated a predetermined number of times while a position of the power-supplying coil with respect to the power-receiving coil is changed, and the power-supplying coil is disposed, by the control device, in a position of the power-supplying coil where the highest of the efficiencies calculated in the third step is obtained and electric power is continuously supplied from the power-supplying coil to the power-receiving coil in this state.

Moreover, a power-supplying method according to a second aspect of the present invention is a power supplying method using the power-supplying device and includes a calculating step of calculating an efficiency of the electric power transmission from the power-supplying coil to the power-receiving coil by the efficiency calculating section while continuously supplying electric power from the power-supplying coil to the power-receiving coil while the ship is moored, and the calculating step is repeated a predetermined number of times while a position of the power-supplying coil is changed by the moving device, and the power-supplying coil is disposed, by the control device, in a position of the power-supplying coil where the highest of the efficiencies calculated in the calculating step is obtained.

Furthermore, a power-supplying device according to a second aspect of the present invention is a device configured to supply electric power to a ship having the power-receiving structure and includes a power-supplying coil, provided on a land-side, configured to supply electric power to the power-receiving coil through the electromagnetic field-transmissive section, a support supporting the power-supplying coil, and a suction device attached to the support, and the suction device adheres to an outer surface of side of the ship in a state in which the power-supplying coil opposes to the power-receiving coil through the electromagnetic field-transmissive section.

Effects of the Invention

According to the present invention, the power-receiving coil is provided on the inside of the outer wall surface-forming section of the ship and the electromagnetic field-transmissive section formed of a material through which an electromagnetic field propagates is provided in the opposing portion to the power-receiving coil in the outer wall surface-forming section. By this configuration, the power-receiving coil is not protruded from the outer surface of side of the ship but can wirelessly receive electric power from the power-supplying coil on the land-side through the electromagnetic field-transmissive section.

Accordingly, the power-receiving coil does not disturb the navigation of the ship and is not required to be pulled into the ship after the supply of the electric power to the ship is finished.

DESCRIPTION OF EMBODIMENTS

Preferred embodiments of the present invention will be described with reference to the drawings. In each of the drawings, common parts have the same reference numerals and repetitive explanation will be omitted.

Figure 1:
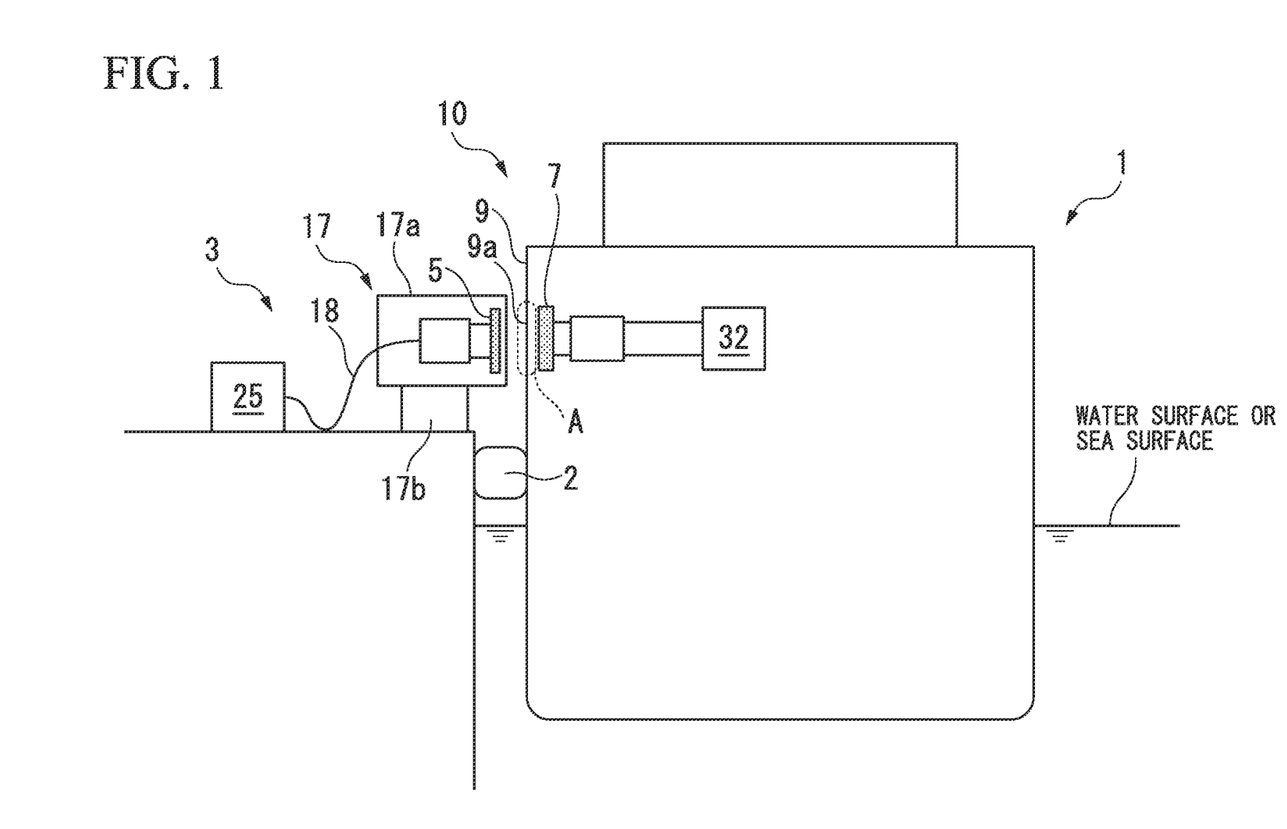
FIG. 1 is a view showing a ship having a power-receiving structure according to embodiments of the present invention and a power-supplying device according to a first embodiment of the present invention.

FIG. 1 shows a ship 1 having a power-receiving structure 10 according to the embodiments of the present invention and a power-supplying device 3 according to a first embodiment of the present invention. FIG. 1 is a view showing the ship 1 seen in a front-rear direction.

The ship 1 can wirelessly receive electric power by the power-receiving structure 10 without using a terminal from a power-supplying coil 5 of the power-supplying device 3 provided on a land.

The power-receiving structure 10 includes a power-receiving coil 7 capable of wirelessly receiving electric power from the power-supplying coil 5 on a land-side when the ship 1 is moored at a shore and an outer wall surface-forming section 9 forming an outer surface of side of the ship 1 (that is, an outer surface of an outer plate of the ship). An electromagnetic field-transmissive section 9a is provided in an opposing portion to the power-receiving coil 7 in the outer wall surface-forming section 9. The electromagnetic field-transmissive section 9a is formed of a material through which an electromagnetic field (an electric field and a magnetic field) propagates. At the outer plate of the ship which is the outer wall surface-forming section 9, the electromagnetic field-transmissive section 9a is embedded in a through hole formed by boring a portion to which the power-receiving coil 7 is opposing. The power-receiving coil 7 is provided on an inside of the ship 1 from the outer wall surface-forming section 9.

According to the present embodiment, at least the opposing portion to the power-receiving coil 7 in the outer wall surface-forming section 9 is the electromagnetic field-transmissive section 9a formed of the material through which the electromagnetic field (the electric field and the magnetic field) propagates. Consequently, the power-receiving coil 7 can wirelessly receive electric power from the power-supplying coil 5 on the land-side through the electromagnetic field-transmissive section 9a.

The material of the electromagnetic field-transmissive section 9a is preferably fiber reinforced plastic (FRP). However, the material of the electromagnetic field-transmissive section 9a is not restricted thereto but may be plastic, for example. A fiber configured to reinforce plastic is a carbon fiber, a glass fiber, a polyethylene fiber, an aramid fiber or the like and plastic are impregnated in a fiber with an orientation of the fiber held, a plurality of fibers is superposed on each other in different fiber directions or fibers cut finely are mixed into plastic. Although an electromagnetic field passes through, the power-receiving coil 7 can be prevented from directly coming in contact with a support 41. Thus, the coil 7 or a member formed of a metal such as an electric wire can be prevented from being corroded by sea water. It is desirable that a portion between the electromagnetic field-transmissive section 9a and the outer wall surface-forming section 9 should be sealed with an elastic rubber or the like.

In the outer wall surface-forming section 9, it is possible that only a portion to which the power-receiving coil 7 is opposing in an axial direction thereof (a portion surrounded in a broken line A in FIG. 1, for example) is the electromagnetic field-transmissive section 9a. Instead, the whole outer wall surface-forming section 9 of the ship 1 may be the electromagnetic field-transmissive section 9a.

In the power-receiving structure 10 in accordance with the present embodiment, the power receiving coil 7 is not protruded from the outer surface of side of the ship 1 but can wirelessly receive electric power from the power-supplying coil 5 on the land-side through the electromagnetic field-transmissive section 9a.

Accordingly, the power-receiving coil 7 does not disturb the navigation of the ship 1. Moreover, the power-receiving coil 7 is not required to be pulled into the ship 1 after supply of electric power to the ship 1 is finished. Therefore, a time required to start and stop the receipt of the electric power can be shortened.

Figure 2:
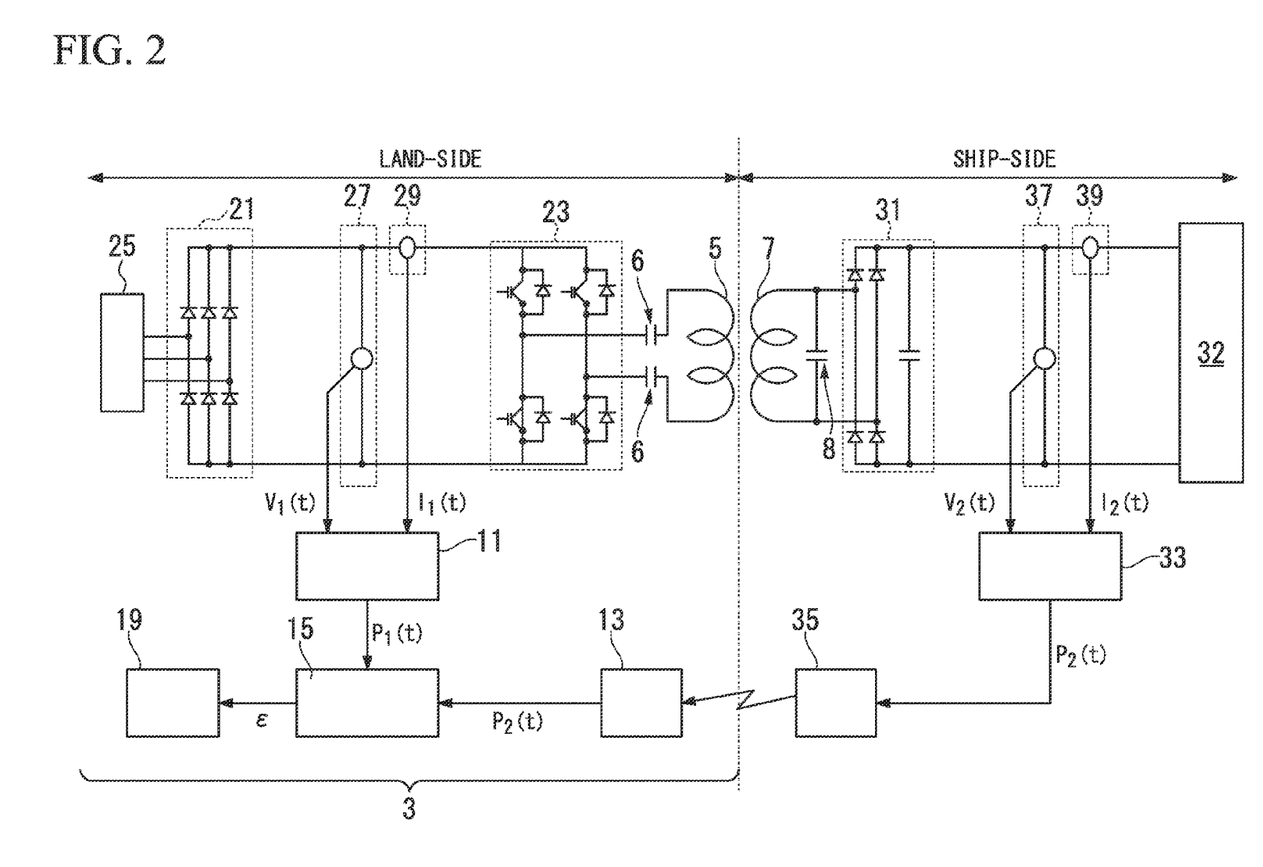
FIG. 2 is a view showing circuit configuration on a land-side and a ship-side.

FIG. 2 shows a circuit configuration including the power-supplying device 3 and the power-receiving coil 7.

The power-supplying device 3 according to the first embodiment of the present invention includes the power-supplying coil 5, a supply power measuring section 11, a receiving section 13, an efficiency calculating section 15, a moving device 17 and a control device 19 as is shown in FIGS. 1 and 2.

The power-supplying coil 5 is provided on the land-side. An electromagnetic coupling circuit is realized by the power-supplying coil 5 and the power-receiving coil 7 in a state in which the power-supplying coil 5 is close to the power-receiving coil 7. In this state, AC power is supplied to the power-supplying coil 5 so that the power-supplying coil 5 wirelessly transmits electric power to the power-receiving coil 7 via the electromagnetic field-transmissive section 9a. The electromagnetic coupling circuit uses an electromagnetic induction system or an electromagnetic field resonance system. In FIG. 2, two capacitors 6 are connected to the power-supplying coil 5 in series and a capacitor 8 is connected to the power-receiving coil 7 in parallel.

The supply power measuring section 11 measures electric power supplied to the power-supplying coil 5. The supply power measuring section 11 outputs a measured value $P_1(t)$ of electric power obtained by multiplying a measured value $V_1(t)$ of a voltage supplied to the power-supplying coil 5 and a measured value $I_1(t)$ of a current supplied to the power-supplying coil 5. As is shown in FIG. 2, the power-supplying device 3 is provided with a rectifier circuit 21, an inverter 23 and an external power supply 25. The rectifier circuit 21 coverts AC power from the external power supply 25 into DC power. The inverter 23 converts the DC power from the rectifier circuit 21 into AC power and supplies the AC power to the power-supplying coil 5. The measured value $V_1(t)$ of the voltage and the measured value $I_1(t)$ of the current are obtained by measuring a DC voltage and a direct current, respectively, from the rectifier circuit 21 between the rectifier circuit 21 and the inverter 23. The measured value $V_1(t)$ of the voltage and the measured value $I_1(t)$ of the current are measured by a voltage measuring device 27 and a current measuring device 29 shown in FIG. 2, respectively.

The receiving section 13 receives a measured value of a power receiving amount of the power-receiving coil 7 from the ship 1 side. A measured value (a measured value of electric power) $P_2(t)$ of the power receiving amount is obtained by multiplying a measured value $V_2(t)$ of a voltage supplied from the power-supplying coil 5 to the power-receiving coil 7 and a measured value $I_2(t)$ of a current supplied from the power-supplying coil 5 to the power receiving coil 7.

As is shown in FIG. 2, the ship 1 is provided with a rectifier circuit 31, a power receiving amount measuring section 33 and a transmitting section 35. The rectifier circuit 31 converts AC power from the power-receiving coil 7 into DC power and supplies the DC power to a load 32 in the ship 1. An electricity storage device may be provided in place of the load 32. The power receiving amount measuring section 33 calculates, as the measured value $P_2(t)$ of the power receiving amount, a value obtained by multiplying a measured value $V_2(t)$ of a DC voltage from the rectifier circuit 31 and a measured value $I_2(t)$ of a direct current from the rectifier circuit 31. The measured value $V_2(t)$ of the voltage and the measured value $I_2(t)$ of the current are measured by a voltage measuring device 37 and a current measuring device 39 shown in FIG. 2, respectively. The transmitting section 35 wirelessly transmits the measured value $P_2(t)$ of the electric power calculated by the power receiving amount measuring section 33 to the receiving section 13.

The efficiency calculating section 15 measures an efficiency of electric power transmission from the power-supplying coil 5 to the power-receiving coil 7 based on the measured value $P_1(t)$ of the electric power measured by the supply power measuring section 11 and the measured value $P_2(t)$ of the electric power received from the transmitting section 35 on the ship 1 side. The efficiency $\epsilon$ is calculated in accordance with the following equation.

$$\epsilon = P_2(t)/P_1(t) \qquad \text{[Equation 1]}$$

The moving device 17 is provided on the land-side and moves the power-supplying coil 5 with respect to the land, thereby changing a position of the power-supplying coil 5. The moving device 17 is configured to move the power-supplying coil 5 in a horizontal direction along the outer surface of side of the ship 1 and in a vertical direction, thereby enabling adjustment of the position of the power-supplying coil 5. In other words, the moving device 17 includes a mobile body 17a having the power-supplying coil 5 attached thereto, a moving mechanism 17b configured to move the mobile body 17a in the horizontal direction and in the vertical direction, and a motive power supply (not shown) configured to give motive power configured to move the mobile body 17a to the moving mechanism 17b. The moving device 17 may be configured to move the power-supplying coil 5 in the horizontal direction along the outer surface of side of the ship 1 and in the vertical direction, and furthermore, to move the power-supplying coil 5 in an direction perpendicular to the outer surface of side of the ship 1.

Electric power is supplied by a cable 18 from the external power supply 25 that is stationary with respect to the land to the power-supplying coil 5 attached to the mobile body 17a that is moved with respect to the land. The cable 18 may be deformably flexed or may be freely wound off from a drum in order to follow a change in a position of the mobile body 17a of the moving device 17. The rectifier circuit 21 and the inverter 23 may be provided in the mobile body 17a or may be provided on the external power supply 25 side so as to be stationary with respect to the land.

The control device 19 controls the moving device 17 to move the power-supplying coil 5. In particular, the control device 19 controls the moving device 17 to move the power-supplying coil 5 based on an efficiency $\epsilon$ calculated by the efficiency calculating section 15, thereby adjusting the position of the power-supplying coil 5 with respect to the power-receiving coil 7. In other words, the control device 19 performs control of Step S6 which will be described below.

Next, description will be given of a power-supplying method using the power-supplying device 3 according to the first embodiment of the present invention.

Figure 3:
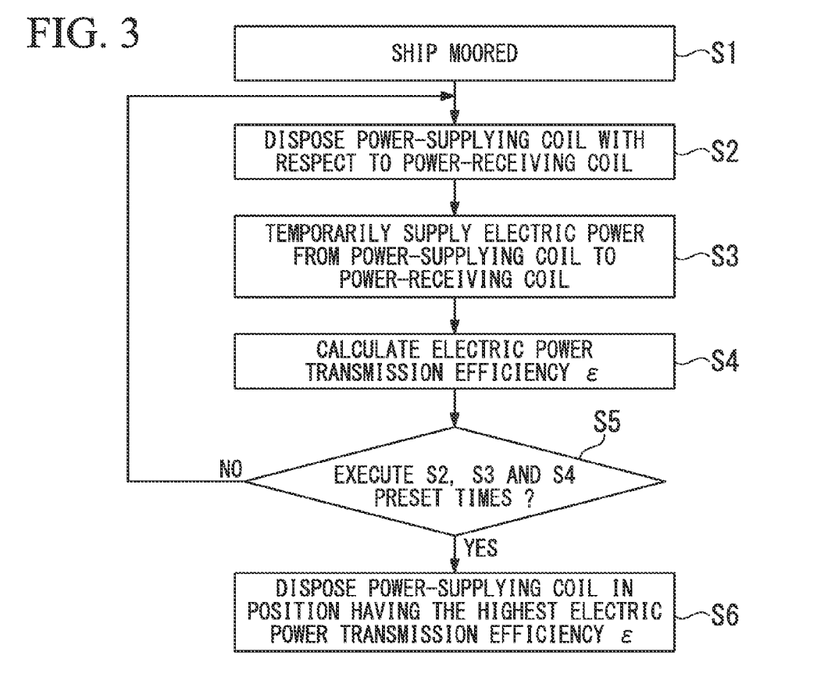
FIG. 3 is a flowchart showing a first method of supplying electric power to the ship when the ship is moored.

FIG. 3 is a flowchart showing a first method of supplying electric power to the ship 1 when the ship 1 is moored.

In Step S1, the ship 1 ends navigation and is moored at a predetermined shore. As is shown in FIG. 1, at this time, the ship 1 collides with a cushioning material 2 provided on a quay and can be thus prevented from directly colliding with the quay.

In Step S2, the power-supplying coil 5 is disposed with respect to the power-receiving coil 7 of the moored ship 1. In other words, the moving mechanism 17b is disposed or operated to place the power-supplying coil 5 attached to the mobile body 17a of the moving device 17 in the power-supplying device 3 in an opposing position to the power-receiving coil 7 of the ship 1 moored in the Step S1.

It is possible to end the disposition in the Step S2 through the Step S1 by mooring the ship 1 so that the power-receiving coil 7 of the ship 1 opposes to the power-supplying coil 5 provided on the land-side in the Step S1.

In Step S3, electric power is temporarily supplied from the power-supplying coil 5 to the power-receiving coil 7. At this time, the electric power supplied to the power-supplying coil 5 (that is, the measured value $P_1(t)$ of the electric power) is measured by the supply power measuring section 11 and the electric power supplied to the power-receiving coil 7 (that is, the measured value $P_2(t)$ of the electric power) is measured by the power receiving amount measuring section 33.

In the Step S3, in consideration of the fact that the ship 1 rolls and pitches by a wave on a water surface or on a sea surface, the electric power supplied to the power-supplying coil 5 may be measured a plurality of times at different time points so that an average value of the measured values thus obtained may be set to be the measured value $P_1(t)$ of the electric power to be used in next Step S4. In the Step S3, similarly, the electric power supplied to the power-receiving coil 7 may be measured a plurality of times at different time points so that the average value of the measured values thus obtained may be set to be the measured value $P_2(t)$ of the electric power to be used in the next Step S4.

In the Step S4, referring to the supply of the electric power from the power-supplying coil 5 to the power-receiving coil 7 that is executed in the Step S3, the efficiency $\epsilon$ of the electric power transmission is calculated by the efficiency calculating section 15. In other words, the efficiency $\epsilon$ of the electric power transmission is calculated by the efficiency calculating section 15 based on the measured value $P_1(t)$ of the electric power and the measured value $P_2(t)$ of the electric power which are measured in the Step S3.

In Step S5, it is judged whether the Steps S2, S3 and S4 have been executed a preset plurality of times (preferably 3 times or more) or not. Between these plurality of executions, the position of the power-supplying coil 5 disposed in the Step S2 with respect to the power-receiving coil 7 is varied (for example, approximately by 10 cm or by 20 cm). These positions may be different from each other in a horizontal direction or in a vertical direction or may be scattered in a grid pattern at an interval in the horizontal direction and in the vertical direction. If the judgment in the Step S5 is Yes (that is, the Steps S2, S3 and S4 have been executed a preset plurality of times), the processing proceeds to Step S6. If the judgment in the Step S5 is No (that is, the Steps S2, S3 and S4 have been executed a smaller number of times than the preset plurality of times), the processing returns to the Step S2. If the ship 1 floats on the sea surface, a position of the ship 1 with respect to the land is not greatly changed by rise and fall of tides in approximately a few minutes or less. Accordingly, the position of the power-supplying coil 5 with respect to the land may be used in place of the position of the power-supplying coil 5 with respect to the power-receiving coil 7.

In the Step S6, the moving device 7 is controlled by the control device 19 to dispose the power-supplying coil 5 in a position where the highest of the calculated efficiencies 6 is obtained during a plurality of executions of the Step S4. In this state, the electric power is continuously supplied from the power-supplying coil 5 to the power-receiving coil 7.

By the power-supplying method, it is possible to perform the electric power transmission from the power-supplying coil 5 to the power-receiving coil 7 continuously efficiently. Moreover, a precise mark indicative of the position of the power-receiving coil 7 does not need to be provided on the outer surface of side of the ship 1 in order to position the power-supplying coil 5 with respect to the power-receiving coil 7.

Referring to the power-supplying method, the electromagnetic coupling circuit preferably uses an electromagnetic field resonance system. In this case, even if the position of the power-supplying coil 5 with respect to the power-receiving coil 7 is shifted, the efficiency of the electric power transmission from the power-supplying coil 5 to the power-receiving coil 7 is not much reduced. Even if the position of the power-supplying coil 5 with respect to the power-receiving coil 7 is changed due to the rocking motion of the ship 1 that is caused by the wave on the sea surface, consequently, it is possible to prevent the electric power transmission efficiency from being reduced. Thus, it is possible to decrease an efficiency fluctuation amount caused by the rocking motion of the wave.

Figure 4:
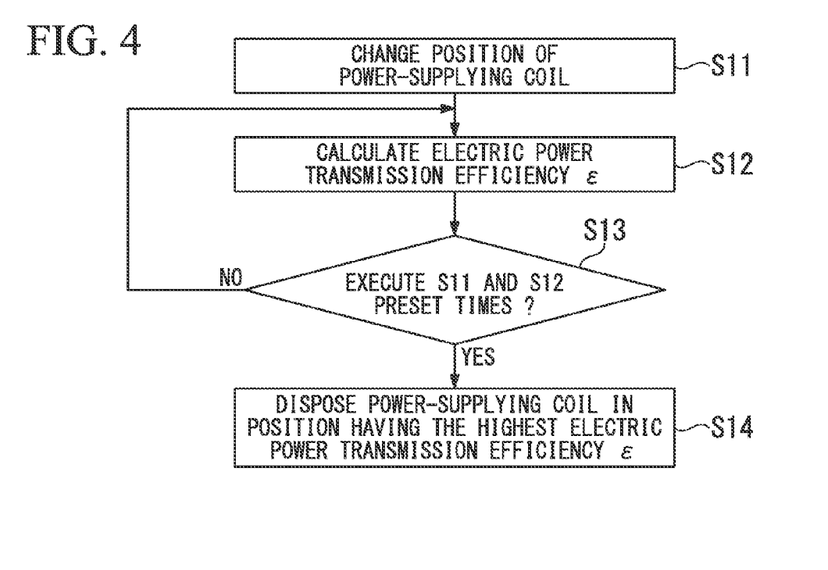
FIG. 4 is a flowchart showing a second method of supplying electric power to the ship while the ship is moored.

FIG. 4 is a flowchart showing a second method of supplying electric power to the ship 1 while the ship 1 is moored. Referring to the power-supplying method, the electric power is continuously supplied from the power-supplying coil 5 to the power-receiving coil 7 while the ship 1 is moored, and at the same time, Steps S11, S12, S13 and S14, which will be described below, are repeated at a time interval. This power-supplying method is performed after the Step S6 explained above, for example.

In the Step S11, the position of the power-supplying coil 5 is changed by the control device 19. In other words, the moving device 17 slightly (for example, approximately by 10 cm) moves the power-supplying coil 5 from the position of the power-supplying coil 5 at the present time to another position.

In the Step S12, the efficiency $\epsilon$ of the electric power transmission from the power-supplying coil 5 to the power-receiving coil 7 is calculated by the efficiency calculating section 15 in a state in which the position of the power-supplying coil 5 is changed in the Step S11. The calculation is carried out by the same method as that in the Step S4.

In the Step S13, it is judged whether the number of execution times of the Steps S11 and S12 reaches a preset plurality of times (preferably three times or more) or not. If the judgment is Yes (that is, the Steps S11 and S12 have been executed a preset plurality of times), the processing proceeds to Step S14. If the judgment is No (that is, the number of the execution times of the Steps S11 and S12 is smaller than the preset plurality of times), the processing returns to the Step S11. As an example, it is preferable that a preset number of times should be four and the position of the power-supplying coil 5 should be changed once for each of upward, downward, leftward and rightward directions from the position at the present time in the Step S11.

In the Step S14, then, the power-supplying coil 5 is disposed, by the control device 19, in the position of the power-supplying coil 5 where the highest of the calculated efficiencies $\epsilon$ is obtained during a plurality of executions of the Step S12.

The Steps S11, S12, S13 and S14 are executed at a time interval (for example, an interval of one to five minutes). Even if the position of the power-supplying coil 5 with respect to the power-receiving coil 7 is changed to a position where the electric power transmission efficiency is reduced due to the rise and fall of tides or a change in a draft of the ship, accordingly, the position of the power-supplying coil 5 is modified to a position where the electric power transmission efficiency is increased.

Figure 5:
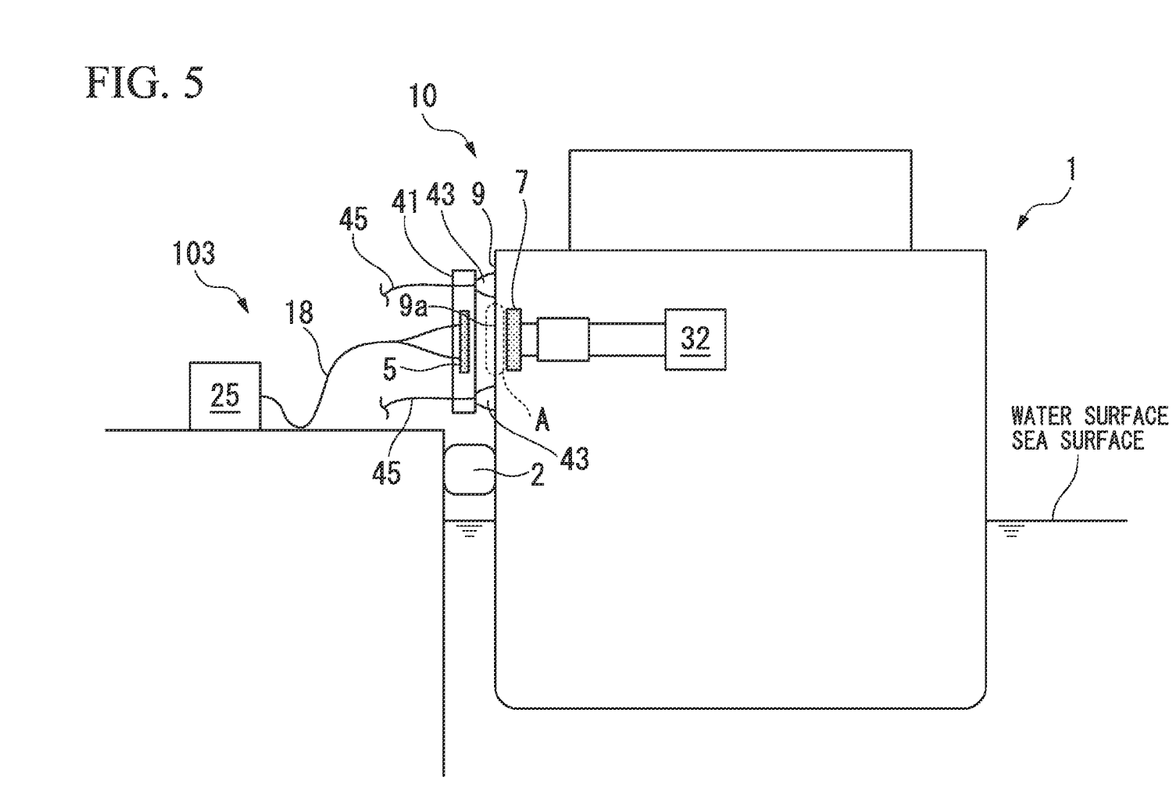
FIG. 5 is a view showing a power-supplying device according to a second embodiment of the present invention.

FIG. 5 shows a configuration of a power-supplying device 103 according to a second embodiment of the present invention. The power-supplying device 103 supplies electric power to the ship 1 having the power-receiving structure 10. FIG. 5 is a view showing the ship 1 seen in a front-rear direction. The power-supplying device 103 according to the second embodiment is different from the power-supplying device 3 according to the first embodiment in that the supply power measuring section 11, the receiving section 13, the efficiency calculating section 15, the moving device 17 and the control device 19 are not provided but a support 41 configured to support the power-supplying coil 5 and a suction device 43 attached to the support 41 are provided instead.

In FIG. 5, the power-supplying device 103 includes the support 41 configured to support the power-supplying coil 5 and the suction device 43 attached to the support 41. The power-supplying coil 5 can adhere to the outer surface of side of the ship 1 in a state in which the power-supplying coil 5 is opposing to the power-receiving coil 7 through the electromagnetic field-transmissive section 9a.

The suction device 43 is preferably a vacuum cup attached to the support 41. The vacuum cup can adhere to the outer surface of side of the ship by sucking internal air through a sucking source (not shown) via a deformable tube 45. The sucking source is a vacuum pump, for example.

An installation area of the suction device 43 is predetermined to be a predetermined area in which the power-supplying coil 5 and the power-receiving coil 7 oppose to each other through the electromagnetic field-transmissive section 9a with the suction device 43 adhering to the outer surface of side of the ship. For example, within the installation area of the suction device 43 the surface of the outer surface of side of the ship is made smooth so that the suction device 43 (the vacuum cup) can easily adheres and outside of the installation area the surface is made rough so that the suction device 43 is difficult to adhere.

Within the installation area, the adhesion of the suction device 43 is carried out following a procedure of FIG. 6 in the following manner.

Figure 6:
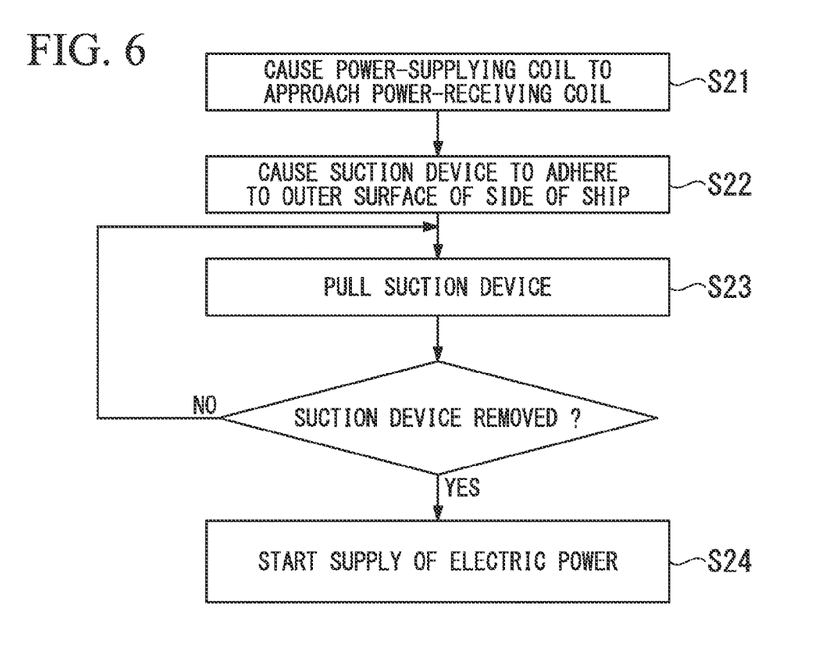
FIG. 6 is a flowchart showing a procedure to be executed before starting supply of electric power to a ship moored at a shore.

FIG. 6 is a flowchart showing a procedure for starting supply of electric power to the ship 1 moored at a shore.

In Step S21, the position of the power-receiving coil 7 in the ship 1 is roughly known in advance. When the ship 1 is moored at the shore, therefore, the power-supplying coil 5 is caused to approach the position of the power-receiving coil 7.

In Step S22, next, the suction device 43 is caused to adhere to the outer surface of side of the ship.

In Step S23, the support 41 (that is, the suction device 43) is pulled away from the outer surface of side of the ship in this state.

If the suction device 43 is removed from the outer surface of side of the ship, consequently, the position of the support 41 is shifted, and again, the suction device 43 is caused to adhere to the outer surface of side of the ship in another position in the Step S22 and the support 41 is pulled away from the outer surface of side of the ship in this state in the Step S23.

The operations of the Steps S22 and S23 are repeated until the suction device 43 is not removed from the outer surface of side of the ship even if the support 41 is pulled away from the outer surface of side of the ship.

When the suction device 43 is not removed from the outer surface of side of the ship even if the support 41 is pulled away from the outer surface of side of the ship in the Step S23, it is judged that the suction device 43 adheres to the outer surface of side of the ship within the installation area. Therefore, the processing proceeds to Step S24.

In the Step S24, supply of electric power from the power-supplying coil 5 to the power-receiving coil 7 is started in the state in which the suction device 43 adheres to the outer surface of side of the ship. Then, the position of the suction device 43 with respect to the shore is varied by the rise and fall of tides or a change in a draft of the ship. The tube 45 is deformably flexed to follow the change in the position.

In the power-supplying device 103 according to the second embodiment, if the suction device 43 is not removed from the outer surface of side of the ship through the Step S23, the power-supplying coil 5 subsequently moves integrally with the ship 1 and the power-receiving coil 7 by the wave on the water surface or the sea surface, for example. Accordingly, the supply of electric power can be performed stably.

Moreover, it is possible to search for the position of the power-receiving coil 7 (that is, the installation area) based on the judgment whether the suction device 43 is not removed from the outer surface of side of the ship in the Step S23. For this reason, a precise mark indicative of the position of the power-receiving coil 7 is not required.

In the power-supplying device 103 according to the second embodiment, in the case in which the electromagnetic coupling circuit realized by the power-supplying coil 5 and the power-receiving coil 7 uses an electromagnetic field resonance system, the efficiency of electric power transmission from the power-supplying coil 5 to the power-receiving coil 7 is not much reduced even if the position of the power-supplying coil 5 with respect to the power-receiving coil 7 is shifted. Even if the power-supplying coil 5 is roughly positioned with respect to the power-receiving coil 7, it is possible to prevent the electric power transmission efficiency from being reduced.

The power-supplying device 103 according to the second embodiment is not provided with the supply power measuring section 11, the receiving section 13, the efficiency calculating section 15, the moving device 17 or the control device 19. The other configurations of the power-supplying device 103 according to the second embodiment are the same as those of the power-supplying device 3 according to the first embodiment.

Although a rectifier circuit 21 and an inverter 23 may be provided on the support 41 in the power-supplying device 103 according to the second embodiment, they are preferably provided on the side of the external power supply 25 so as to be stationary with respect to the land in the supply of electric power from the power-supplying coil 5 to the power-receiving coil 7.

Figure 7:
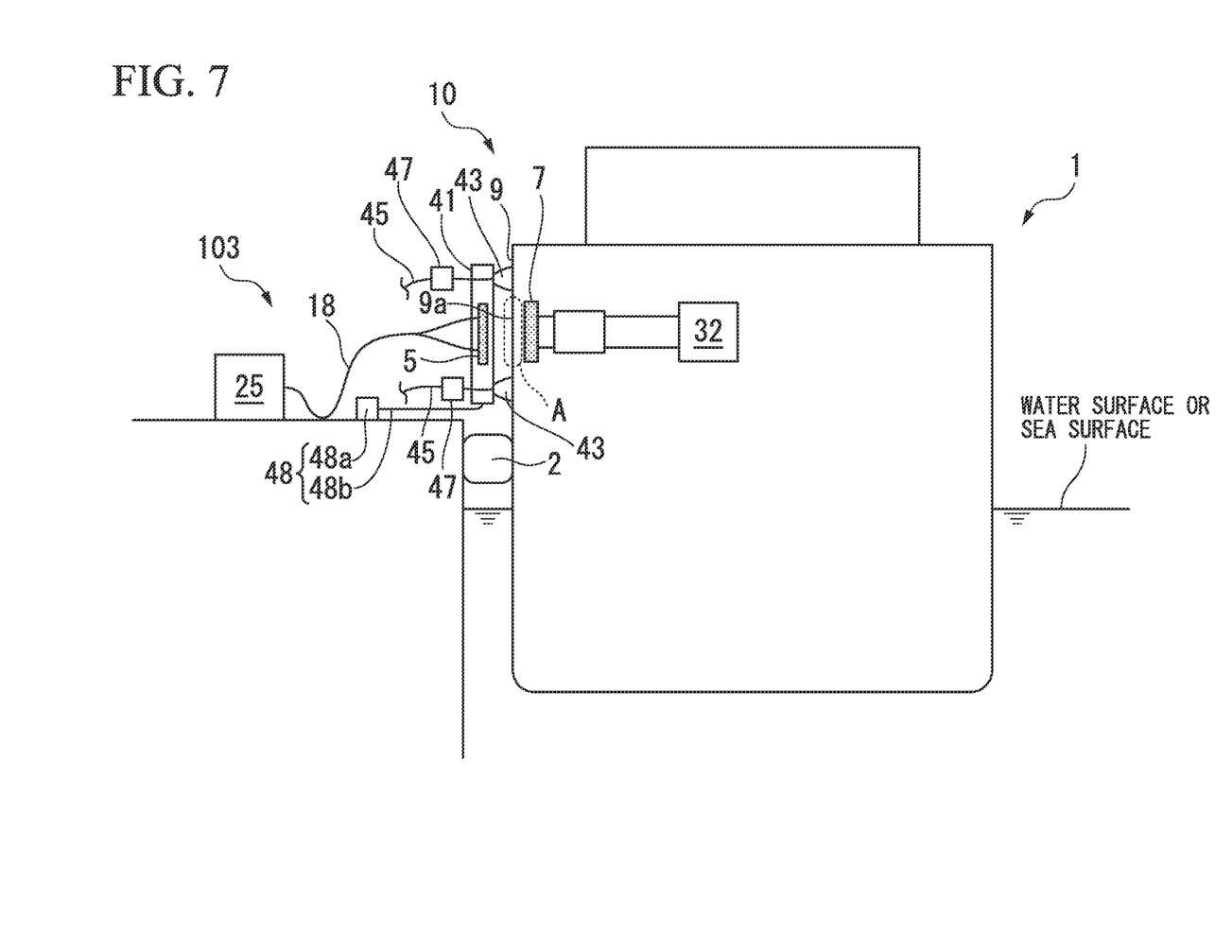
FIG. 7 is a view showing a power-supplying device according to a variant example of the second embodiment of the present invention.

In the power-supplying device 103 according to the second embodiment, moreover, an exhaust valve 47 may be provided in the middle of the tube 45 and a rope switch 48 may be provided between the support 41 and a quay as is shown in FIG. 7.

The exhaust valve 47 turns ON/OFF an exhaust in accordance with an electrical command given from the rope switch 48. In a normal state, the exhaust valve 47 is set so as not to carry out the exhaust.

The rope switch 48 includes a switch 48a and a rope 48b. The switch 48a is turned ON/OFF depending on whether the rope 48b is stretched or slackened. Consequently, it is possible to electrically detect whether the rope 48b is stretched or slackened. A length of the rope 48b is set in such a manner that the rope 48b is slackened during normal power supply and the cable 18 and the tube 45 are not stretched (that is, they are slackened) even when the rope 48b is stretched.

In some cases, the ship 1 leaves the quay with the support 41 adhered to due to an unintended motion of the ship 1, a bad weather or the like. In these cases, the rope 48b of the rope switch 48 is stretched so that the switch 48a is flipped. Consequently, an electrical command is given from the rope switch 48 to the exhaust valve 47 ordering to perform the exhaust. When the exhaust is performed through the exhaust valve 47, the vacuum state of the tube 45 is released. Thus, the adhesion of the suction device 43 attached to the support 41 to the outer surface of side of the ship 1 is terminated and the support 41 leaves the ship 1. Therefore, it is possible to prevent the cable 18 or the tube 45 from being broken. It is more preferable to stop an operation of the sucking source (the vacuum pump) simultaneously with the exhaust from the exhaust valve 47.

Various shapes, combinations or the like of the components shown in the embodiments are only illustrative and addition, omission, replacement and other changes of the structure can be made without departing from the gist of the present invention. The present invention is not restricted to the above description but is restricted to only the appended claims.

For example, the power-supplying device 3 according to the first embodiment or the power-supplying device 103 according to the second embodiment may be provided with a billing device (not shown). In this case, when money is put in the billing device, electric power is supplied from the power-supplying coil 5 to the power-receiving coil 7 for a period of time corresponding to the amount of money. When the period of time passes, supply of electric power from the external power supply 25 to the power-supplying coil 5 is stopped, the mobile body 17a is moved in such a manner that the power-supplying coil 5 goes away from the power-receiving coil 7 in the first embodiment or the suction device 43 stops the adhesion to the outer surface of side of the ship and is thus removed from the outer surface of side of the ship in the second embodiment, for example. If the exhaust valve 47 is provided in the middle of the tube 45, it is also possible to give an electrical command to the exhaust valve 47 in order to perform the exhaust, thereby removing the suction device 43 from the outer surface of side of the ship.

INDUSTRIAL APPLICABILITY

According to the present invention, the power-receiving coil is provided on the inside of the outer wall surface-forming section of the ship and the electromagnetic field-transmissive section formed of a material through which an electromagnetic field propagates is provided in the opposing portion to the power-receiving coil in the outer wall surface-forming section. By this configuration, the power-receiving coil is not protruded from the outer surface of side of the ship but can wirelessly receive electric power from the power-supplying coil on the land-side through the electromagnetic field-transmissive section.

Accordingly, the power-receiving coil does not disturb the navigation of the ship and is not required to be pulled into the ship after the supply of the electric power to the ship is finished.

DESCRIPTION OF REFERENCE SIGNS 1 ship
2 cushioning material
3, 103 power-supplying device
5 power-supplying coil
6 capacitor
7 power-receiving coil
8 capacitor
9 outer wall surface-forming section
9a electromagnetic field-transmissive section
10 power-receiving structure
11 supply power measuring section
13 receiving section
15 efficiency calculating section
17 moving device
17a mobile body
17b moving mechanism
18 cable
19 control device
21 rectifier circuit
23 inverter
25 external power supply
27 voltage measuring device
29 current measuring device
31 rectifier circuit
32 load
33 power receiving amount measuring section
35 transmitting section
37 voltage measuring device
39 current measuring device
41 support
43 suction device
45 tube
47 exhaust valve
48 rope switch

The invention claimed is:
1. A power-supplying device configured to supply electric power to a ship having a power-receiving structure,
the power-receiving structure provided in a ship, comprising:
a power-receiving coil capable of wirelessly receiving electric power from a power-supplying coil on a land-side; and
an outer wall surface-forming section forming an outer surface of side of the ship,
wherein the power-receiving coil is provided on an inside of the ship from the outer wall surface-forming section, and
an electromagnetic field-transmissive section formed of a material through which an electromagnetic field propagates is provided in an opposing portion to the power-receiving coil in the outer wall surface-forming section,
the power-supplying device comprising:
a power-supplying coil, provided on a land-side, configured to supply electric power to the power-receiving coil through the electromagnetic field-transmissive section;

a supply power measuring section configured to measure electric power supplied to the power-supplying coil;

a receiving section configured to receive, from a ship-side, a measured value of electric power received from the power-supplying coil by the power-receiving coil;

an efficiency calculating section configured to calculate a plurality of times an average value of efficiency of electric power transmission from the power-supplying coil to the power-receiving coil based on the supplied electric power measured by the supply power measuring section and the measured value of the electric power received by the receiving section;

a moving device, provided on the land-side, configured to move the power-supplying coil; and a control device configured to control the moving device to move the power-supplying coil based on the average value calculated by the efficiency calculating section, thereby adjusting a position of the power-supplying coil with respect to the power-receiving coil.

2. The power-supplying device according to claim 1, wherein the material of the electromagnetic field-transmissive section is plastic.

3. The power-supplying device according to claim 2, wherein the plastic is fiber reinforced plastic.

4. A power-supplying device configured to supply electric power to a ship having a power-receiving structure, the power-receiving structure provided in a ship, comprising:

a power-receiving coil capable of wirelessly receiving electric power from a power-supplying coil on a land-side; and an outer wall surface-forming section forming an outer surface of side of the ship, wherein the power-receiving coil is provided on an inside of the ship from the outer wall surface-forming section, and an electromagnetic field-transmissive section formed of a material through which an electromagnetic field propagates is provided in an opposing portion to the power-receiving coil in the outer wall surface-forming section, the power-supplying device comprising:

a power-supplying coil, provided on a land-side, configured to supply electric power to the power-receiving coil through the electromagnetic field-transmissive section;

a support supporting the power-supplying coil; and a suction device attached to the support, wherein the suction device adheres to an installation area of an outer surface of a side of the ship in a state in which the power-supplying coil opposes to the power-receiving coil through the electromagnetic field-transmissive section, and the installation area is made more smooth than an area outside of the installation area.

5. The power-supplying device according to claim 4, wherein the suction device is a vacuum cup, and further comprising:

a tube configured to exhaust the vacuum cup;

an exhaust valve which turns ON/OFF the exhaust; and a rope switch which sends an electrical command to turn ON/OFF the exhaust valve.

6. The power-supplying device according to claim 5, wherein the rope switch sends the electrical command to the exhaust valve in response to a relative position of the power-supplying coil and the power-receiving coil.

7. The power-supplying device according to claim 4, further comprising a billing device, wherein the suction device is a vacuum cup, and further comprising:

a tube configured to exhaust the vacuum cup; and an exhaust valve which turns ON/OFF the exhaust;

wherein the exhaust valve is controlled by an electrical command from the billing device.

8. A power supplying method using the power-supplying device according to claim 1, the method comprising:

a first step of disposing the power-supplying coil with respect to the power-receiving coil when the ship is moored;

a second step of temporarily supplying electric power from the power-supplying coil to the power-receiving coil through the electromagnetic field-transmissive section; and a third step of calculating an average value of efficiency of the electric power transmission from the power-supplying coil to the power-receiving coil in the second step by the efficiency calculating section, wherein the first to third steps are repeated a predetermined number of times while a position of the power-supplying coil with respect to the power-receiving coil is changed, and the power-supplying coil is disposed, by the control device, in a position of the power-supplying coil where the highest average value calculated in the third step is obtained and electric power is continuously supplied from the power-supplying coil to the power-receiving coil in this state.

9. A power supplying method using the power-supplying device according to claim 1, comprising a calculating step of calculating an average value of efficiency of the electric power transmission from the power-supplying coil to the power-receiving coil by the efficiency calculating section while continuously supplying electric power from the power-supplying coil to the power-receiving coil while the ship is moored, wherein the calculating step is repeated a predetermined number of times while a position of the power-supplying coil is changed by the moving device, and the power-supplying coil is disposed, by the control device, in a position of the power-supplying coil where the highest average value calculated in the calculating step is obtained.

* * * * *